(12) United States Patent
Chun et al.

(10) Patent No.: US 7,860,515 B2
(45) Date of Patent: Dec. 28, 2010

(54) DATA TRANSMITTING AND RECEIVING METHOD BETWEEN A MOBILE TERMINAL AND AN INFORMATION CENTER IN A NAVIGATION SYSTEM

(75) Inventors: Kyong-Joon Chun, Seoul (KR); Jung-a Yun, Suwon-shi (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 11/116,868

(22) Filed: Apr. 28, 2005

(65) Prior Publication Data

US 2005/0192740 A1 Sep. 1, 2005

Related U.S. Application Data

(62) Division of application No. 10/300,475, filed on Nov. 20, 2002.

(30) Foreign Application Priority Data

Jun. 29, 2002 (KR) ............... 10-2002-0037479

(51) Int. Cl.
*H04W 24/00* (2009.01)
(52) U.S. Cl. ............ 455/456.1; 455/404.2; 455/457
(58) Field of Classification Search ... 455/412.1–412.2, 455/414.2, 456.1, 456.2, 456.3, 457; 709/206, 709/202; 701/201–216
See application file for complete search history.

(56) References Cited

U.S. PATENT DOCUMENTS

| | | | |
|---|---|---|---|
| 4,989,204 A * | 1/1991 | Shimizu et al. ............ 370/328 |
| 5,751,719 A * | 5/1998 | Chen et al. ............... 370/473 |
| 5,983,090 A | 11/1999 | Aoki |
| 6,434,132 B1 * | 8/2002 | Ishii et al. ............... 370/338 |
| 6,563,816 B1 | 5/2003 | Nodoushani et al. |
| 6,667,962 B1 * | 12/2003 | Lee et al. ................. 370/335 |
| 6,816,735 B1 | 11/2004 | Rayburn et al. |
| 6,947,451 B1 * | 9/2005 | Dommety et al. .......... 370/328 |
| 2001/0006890 A1 | 7/2001 | Ryu |
| 2002/0019689 A1 * | 2/2002 | Harrison et al. ............ 701/35 |
| 2002/0026474 A1 * | 2/2002 | Wang et al. ............... 709/203 |
| 2002/0105940 A1 * | 8/2002 | Forssell et al. ............ 370/349 |
| 2002/0142802 A1 * | 10/2002 | Nagasawa et al. .......... 455/557 |
| 2003/0008670 A1 * | 1/2003 | Katoh ..................... 455/456 |
| 2003/0050075 A1 | 3/2003 | Rangarajan et al. |
| 2003/0054795 A1 | 3/2003 | Tamaki et al. |
| 2003/0078031 A1 * | 4/2003 | Masuda .................... 455/406 |
| 2003/0216145 A1 * | 11/2003 | Cox et al. ............... 455/456.1 |
| 2004/0030493 A1 * | 2/2004 | Pechatnikov et al. ....... 701/208 |
| 2005/0003760 A1 | 1/2005 | Suoknuuti et al. |

FOREIGN PATENT DOCUMENTS

| | | |
|---|---|---|
| EP | 1 103 787 | 5/2001 |
| JP | 1999-0078296 | 10/1999 |
| KR | 1020000036661 | 7/2000 |

* cited by examiner

*Primary Examiner*—Dai A Phuong
(74) *Attorney, Agent, or Firm*—The Farrell Law Firm, LLP

(57) ABSTRACT

A data transmitting and receiving method between a mobile terminal and an information center in a navigation system is disclosed. The present invention is characterized in that if lower items of a destination are not received from the information center in the middle of receiving destination setting items to set the destination after the mobile terminal transmits a destination setting request message to the information center, the mobile terminal sends a reconnection request message and stored destination setting data.

4 Claims, 7 Drawing Sheets

DATA TRANSMITTING AND RECEIVING METHOD BETWEEN A MOBILE TERMINAL AND AN INFORMATION CENTER IN A NAVIGATION SYSTEM

PRIORITY

This application is a Divisional of U.S. application Ser. No. 10/300,475, filed Nov. 20, 2002, which claims priority to an application entitled "Data transmitting and receiving method between a mobile terminal and an information center in a navigation system" filed in the Korean Industrial Property Office on Jun. 29, 2002 and assigned Serial No. 02-37479, the contents of which are hereby incorporated by reference herein.

BACKGROUND OF THE INVENTION

1. Field of the Invention

The present invention relates generally to a navigation system, and in particular, to a data transmitting and receiving method between a mobile terminal and an information center.

2. Description of the Related Art

Typically, a navigation system displays a calculated current location of a mobile body using received information from a Global Positioning System (GPS) which is displayed in a map on a screen. Also, the navigation system provides salient driving information including moving direction of the mobile body, distance to a destination, current moving velocity of the mobile body, a path preset by the driver before driving, or an optimal path to the destination, etc. The navigation system or GPS is mounted on the mobile body including a boat, an airplane, an automobile, etc., to be used to determine current location and moving velocity of the mobile body or decide a driving path.

Recently, a navigation system has been developed for providing a navigation function via mobile terminals. FIG. 1 shows an outlined configuration of the navigation system.

Referring to FIG. 1, the navigation system comprises an information center 100, a wireless network 200, a mobile terminal 300 and an Intelligent Transport Systems (ITS) terminal 400. The information center 100 stores map data and real-time traffic information. When the mobile terminal 300 requests the navigation function, the information center 100 generates corresponding navigation information comprising map data and real-time traffic information and provides it to the mobile terminal 300 via the wireless network 200. The wireless network 200 is a path for information transfer between the information center 100 and the mobile terminal 300. The mobile terminal 300 operates not only in a typical mode for providing voice call service to a user, but it also operates in a navigation mode support for the navigation function. In the navigation mode, the mobile terminal 300 is connected to the wireless network 200, receives every kind of navigation information available and provides them to the user by interacting with the ITS terminal 400.

In the navigation mode, the user may request guidance of optimal driving path to the information center 100 by transmitting current location of his car and destination via his mobile terminal 300. Accordingly, the user can be guided to the optimal driving path between the current location and the destination, a typical navigation function, by the information center 100. In the navigation mode, the user can also connect to the information center 100 via the mobile terminal 300 and search neighboring facilities, for example, gas stations, rest areas, repair shops, hospitals/drug stores, lodging houses, sight spots, restaurants/cafés, and theaters/stages, etc.

The navigation system is mounted on the mobile body such as a car, etc., as a separate device, to provide convenient functions such as driving path to a driver. For this, the mobile terminal 300 is connected to the information center 100, sets a desired destination and receives path guiding data generated by the information center 100 via the wireless network 200.

However, there occur cases of disconnection in the middle of setting the destination or receiving the path guiding data due to the limit of data communication through the wireless network 200. For example, during passing a tunnel or due to problems in the wireless network 200 transmission/disconnect problems may occur. In those cases, the mobile terminal 300 must subsequently re-transmit the destination and download the path guiding data.

In the related art, as described above, there is inconvenience of re-transmission and down loading navigation information when the mobile terminal 300 is disconnected from the information center 100 in the middle of setting destination or receiving the path guiding data. There is an additional problem of increase of communication costs for the user due to re-downloading the same data. While reconnecting to the information center 100, the car may also have altered its course in the interim. Then the current location of the car becomes changed. Therefore, the user must download other guiding data for the changed path from the changed current location to the destination.

SUMMARY OF THE INVENTION

It is, therefore, an object of the present invention to provide a data transmitting and receiving method between a mobile terminal and an information center.

It is another object of the present invention to provide a method for making the mobile terminal re-connect with the information center again automatically if the mobile terminal is disconnected from the information center while destination setting or reception of the path guiding data is performed in the navigation system To achieve the above object, there is provided a method for transmitting and receiving data during the setting of a destination between an information center for providing navigation information to a mobile terminal connected with the information center via a wireless network in a navigation system. The method comprises the steps of: Transmitting, at the mobile terminal, a destination setting request message to the information center, Destination setting items are transmitted from the information center to the mobile terminal, when the destination setting request message is received, the destination setting items are received and displayed at the mobile terminal, and selected destination setting data is transmitted to the information center if a destination is selected among the destination setting items by a user. The selected destination setting data is stored at the mobile terminal, sub-items of a destination setting item to which the destination setting data belong are sequentially transmitted by the information center, if the destination setting data are received. A reconnection request message and the stored destination setting data is transmitted by the mobile station to the information center, if the sub-items are not received. The reconnection request message and the stored destination setting data is transmitted to the information center, and the next sub-items after the destination setting item to which the destination setting data belong are then transmitted from the information center. The sub-items transmitted from the information center are received at the mobile terminal, which checks, if the sub-items are final destination setting ones and returns to the receiving and displaying step, if not.

In another aspect of the present invention, there is provided a method for transmitting and receiving path guiding data of a mobile terminal in a navigation system. An information center provides navigation information and the mobile terminal connects with the information center via a wireless network. Information is stored on received data if connection is cut off during reception of the path guiding data. A reconnection request message and a message corresponding to size of the received data is transmitted to the information center. The rest of the path guiding data is transmitted from the information center when the reconnect request and size of the received data is received.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Figure 1:
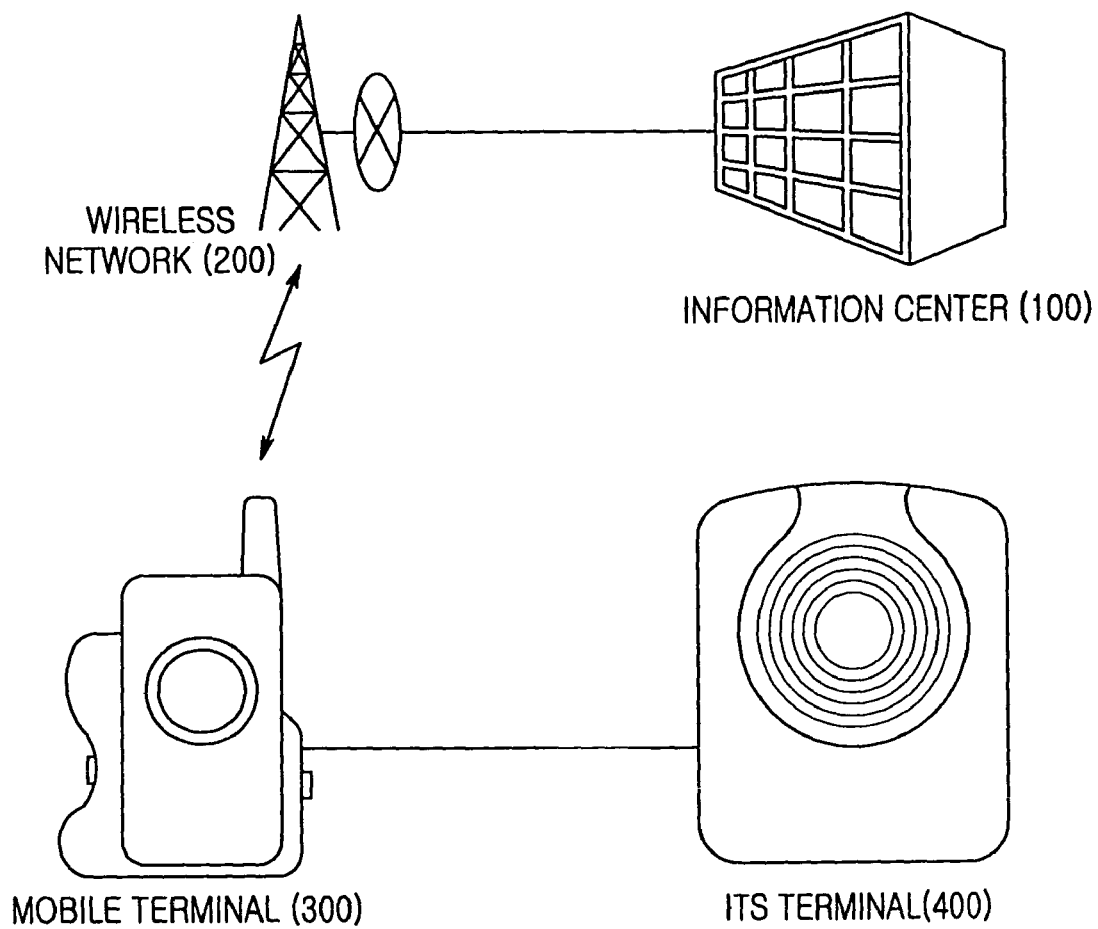
FIG. 1 shows configuration of a general navigation system.
Figure 2:
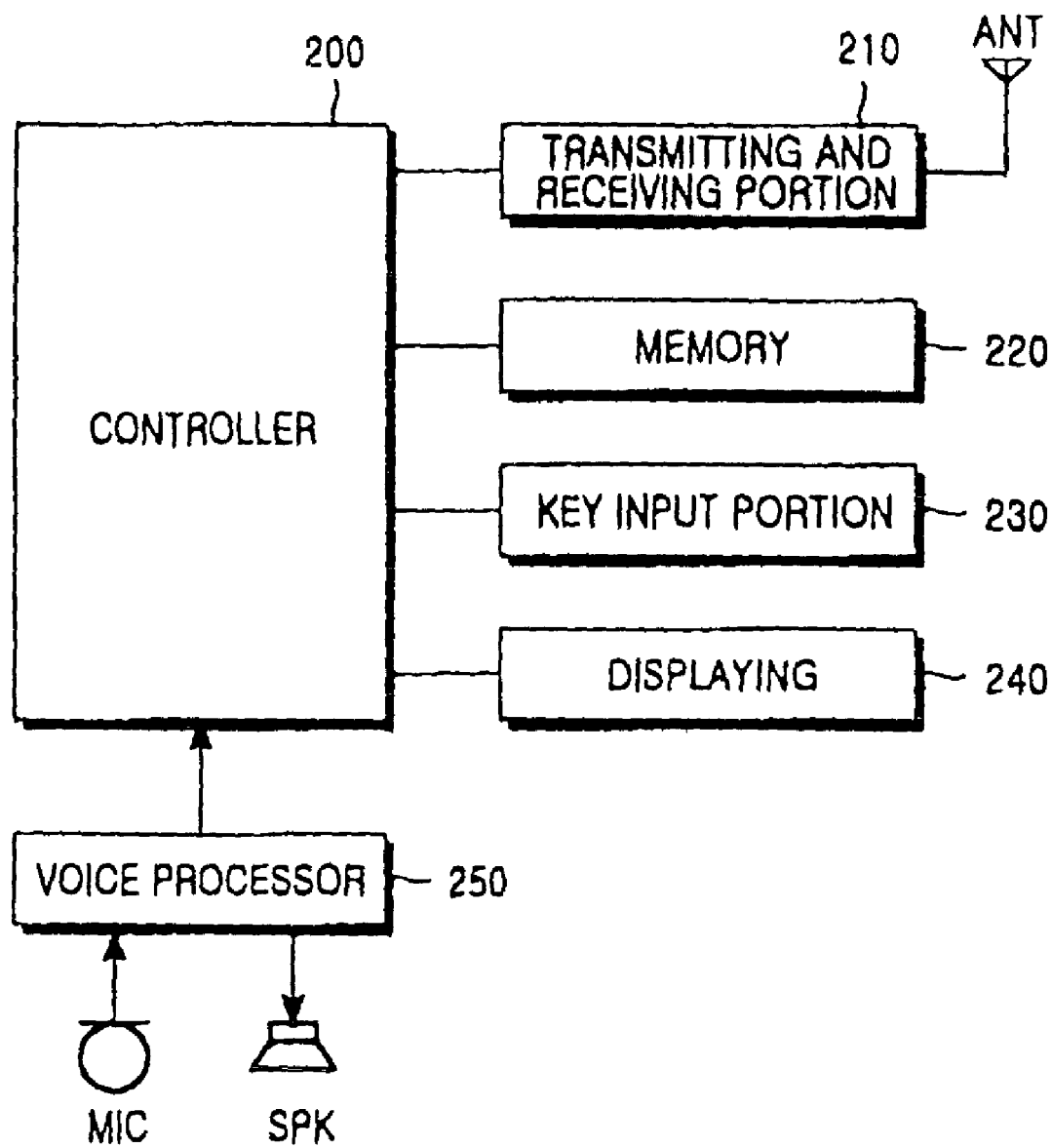
FIG. 2 shows configuration of a mobile terminal to which the present invention is applied.

FIG. 2 shows configuration of a mobile terminal to which the present invention is applied.

Referring to FIG. 2, the mobile terminal 300 comprises an antenna (ATN), a controller 200, a transmitting and receiving portion 210, a memory 220, a key input portion 230, a display 240, a voice processor 250, a microphone (MIC) and speaker (SPK). The ATN is to transmit a transmission signal output from the transmitting and receiving portion 210 to the information center 100 via a wireless network and to receive a signal from the information center 100 via the wireless network. The controller 200 performs general operations of the mobile terminal 300. In particular, according to the present invention, the controller 200 controls operations for reconnection automatically, when the mobile terminal 300 is disconnected from the information center 100 during transmitting and receiving navigation data. Navigation data transmitted and received between the mobile terminal 300 and the information center 100 in the navigation system includes data necessary for setting the destination and the path or route guiding data, etc.

The transmitting and receiving portion 210 outputs/receives signals to/from the information center 100 via the ANT. The memory 200 stores data processed by a navigation program and its operations according to an embodiment of the present invention. In particular, the memory 200 stores the most recent destination-related information until it receives information on sub-items of the destination from the information center 100 when selecting an item of destination setting.

The key input portion 230 is to interface between the mobile terminal 300 and a user. Through the key input portion 230 can the user set a navigation mode and request each kind of navigation information according to navigation services provided. The displaying portion 240 displays items related to operation processes according to an embodiment of the present invention. For example, display items may be as shown in FIG. 6a to FIG. 6e.

The voice processor 250 processes voice signals input from the MIC and to be output to the SPK. The MIC inputs the voice of the user, transforms the input voice to electric signals and outputs them. The SPK transforms the electric signals to speech audio for output to the user. It should be noted that the operations as described above according to the embodiment of the present invention are performed within the mobile terminal 300.

Figure 3:
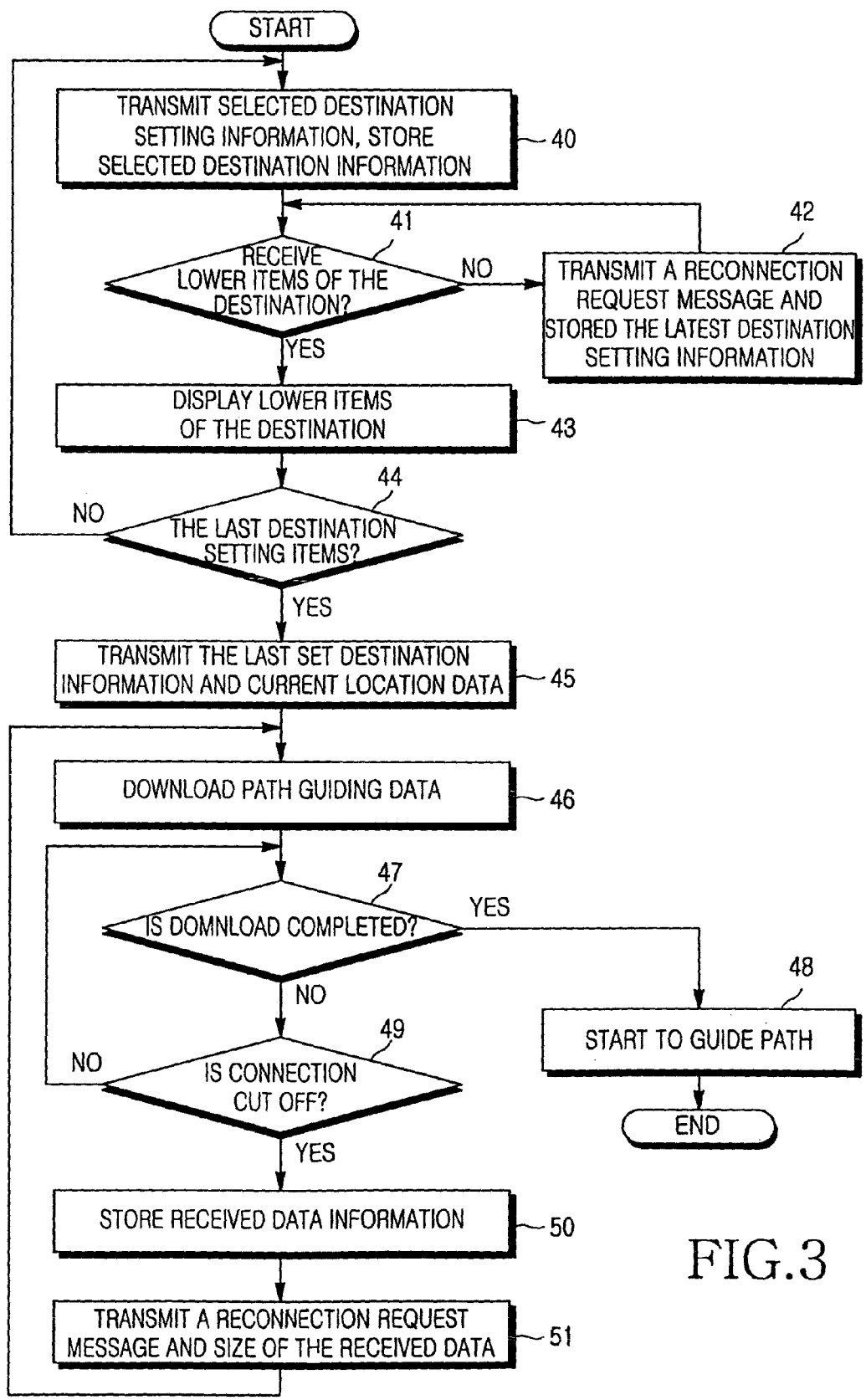
FIG. 3 is a flow chart showing data transmitting and receiving process between the mobile terminal and the information center according to an embodiment of the present invention.

FIG. 3 is a flow chart showing data transmitting and receiving processes between the mobile terminal and the information center according to an embodiment of the present invention.

Figure 4:
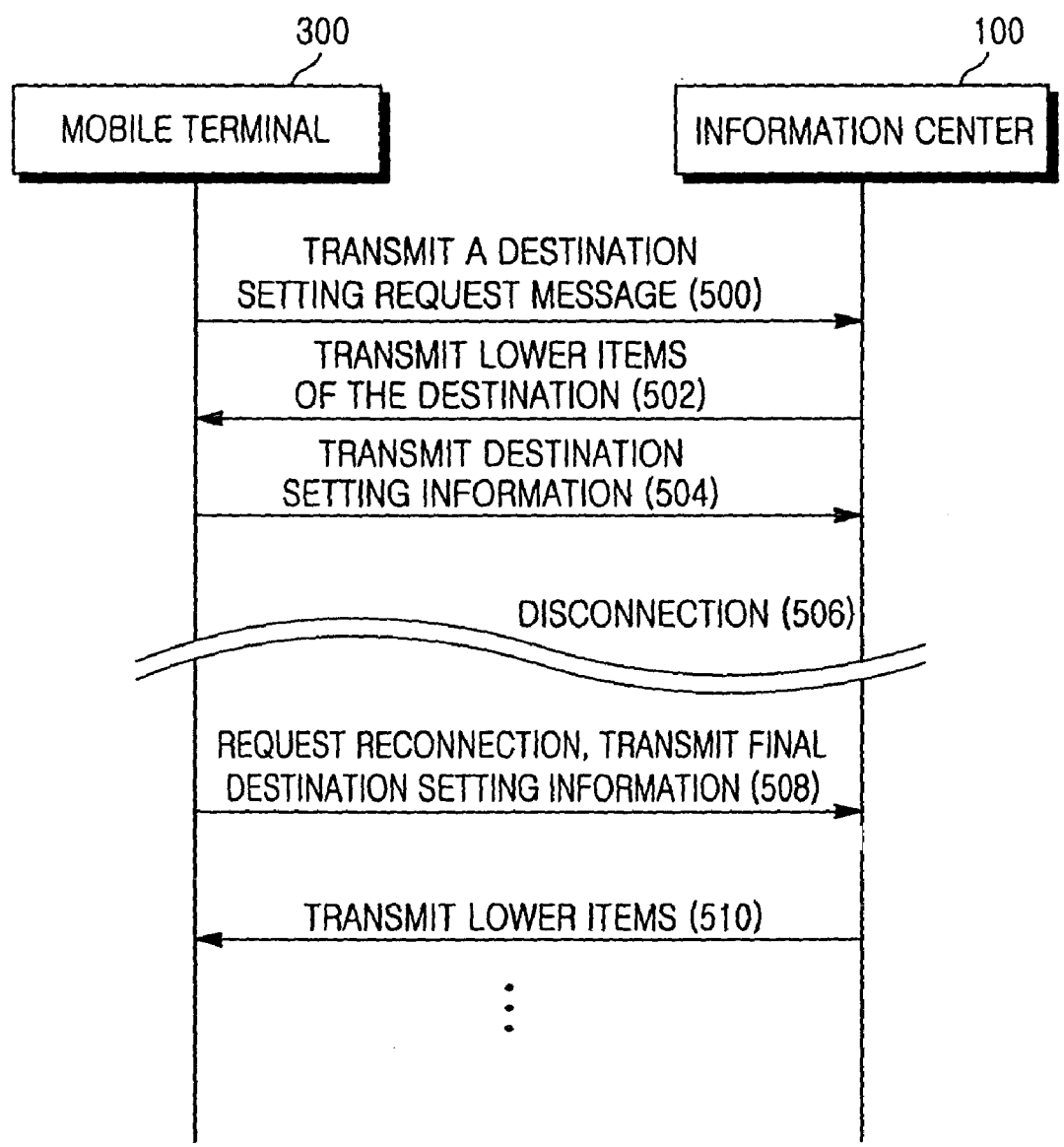
FIG. 4 is a flow chart for signals between the mobile terminal and the information center in the middle of setting a destination according to an embodiment of the present invention.
Figure 5:
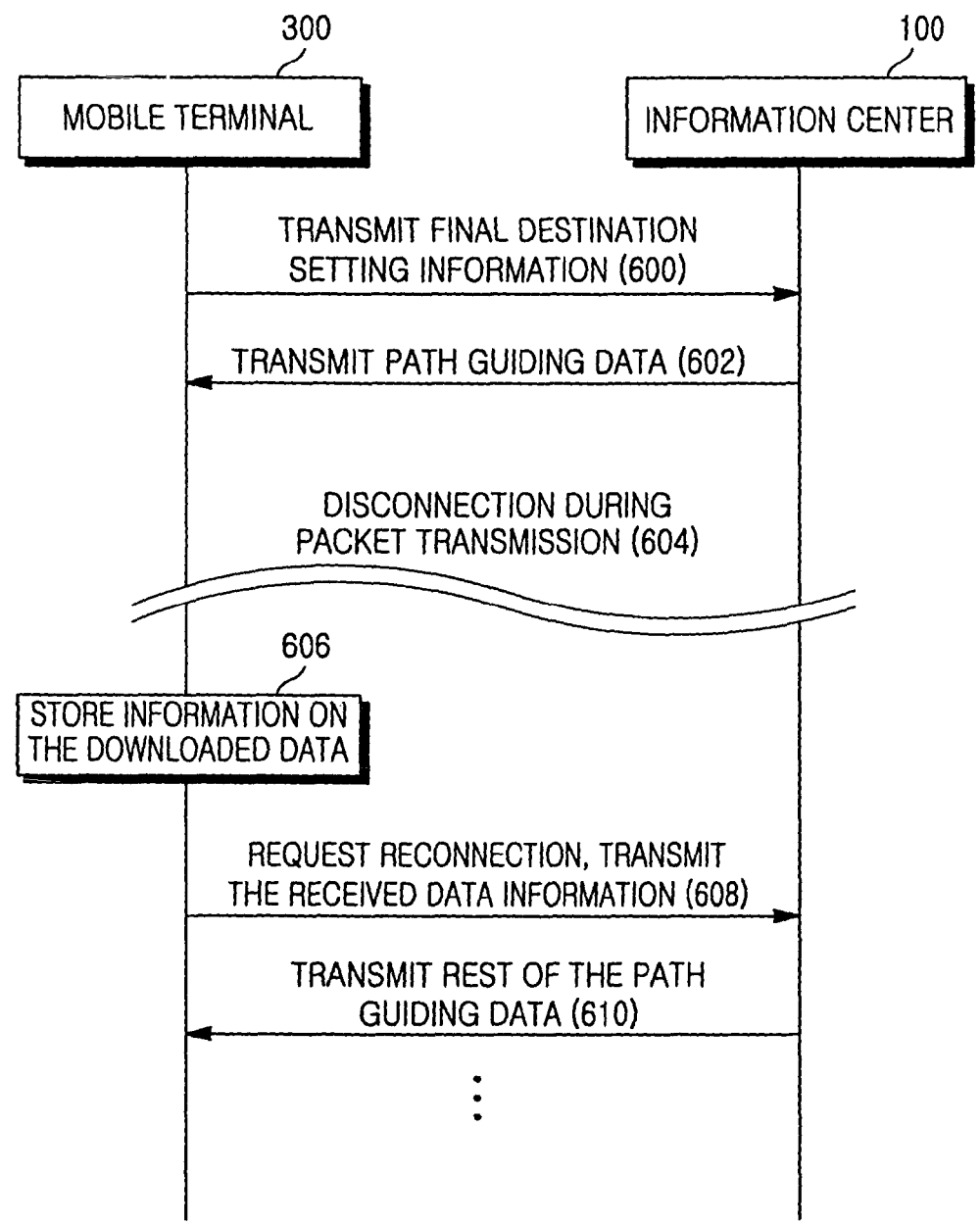
FIG. 5 is a flow chart for signals between the mobile terminal and the information center in the middle of receiving path guiding data according to an embodiment of the present invention.

FIGS. 4 and 5 are flow charts for signals between the mobile terminal and the information center in the process of setting a destination and receiving path guiding data according to embodiments of the present invention, respectively.

In the present invention, the mobile terminal 300 sends a message for requesting destination setting items to the information center when a request for destination setting is input via a user interface. If the mobile terminal receives the destination setting items from the information center and selects a destination using the destination setting items, it sends the destination in the form of destination setting data to the information center 100 and stores the destination setting data to the memory 220. After setting the final destination, the destination-setting data is sent to the information center 100 and the mobile terminal 300 subsequently receives path guiding data from the information center 100. If the mobile terminal 100 is disconnected from the information center during setting the destination and receiving the path guiding data, it sends a message for requesting reconnection to the information center 100.

In addition, when the information center 100 receives the message for requesting destination setting items from the mobile terminal 300, it sends sub-items of destination setting data to the mobile terminal 300. It also generates the path guiding data necessary for guiding the path to the finally requested destination and sends them to the mobile terminal 100. When the connection is cut off during sending the path guiding data and the information center 100 receives a reconnection request message from the mobile terminal 300, it restarts communication and resends items previously requested by the mobile terminal 300. Therefore, when the connection is cut off it is not necessary for the mobile terminal to transmit items of the destination setting or the path guiding data for the finally requested destination from the beginning.

Referring to FIGS. 3 and 4, reconnecting process is described when the connection is cut off during setting the destination. The controller 200 checks if the destination setting is requested. If so, it sends destination setting request message to the information center 100 in step 500. In step 502, the information center 100 sends sub-items for the destination setting request to the mobile terminal 300. Here, the sub-items are the items for setting the destination in the next step after selecting the destination setting.

Generally, a method for limiting the area from a larger one to a narrower one is used for setting the destination using sub-items of information. For example, in order to search a place of "Samsung Electronics Co., Maetan-dong, Paldal-gu, Suwon city, Gyunggi-do", it is set from the sub-item of the destination setting, "Gyunnggi-do" province, corresponding to the largest geographic area including the destination to the sub-item destination for the narrow area of the actual destination of "Samsung Electronics Co.". Accordingly, 5 destination settings are input for the final destination setting.

Figure 6A:
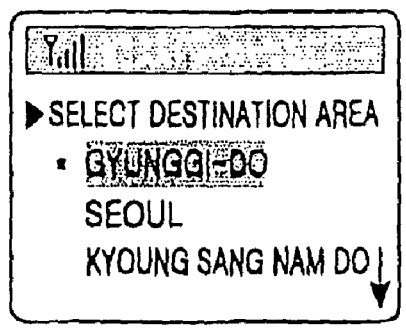
FIG. 6 shows pictures displayed according to an embodiment of the present invention.

For example, as shown in FIG. 6*a*, the largest area including Gyunggi-do, Seoul or Gyungsangnam-do is set first for the destination. The controller 200 of the mobile terminal 300, which has received this, displays the received sub-items on the displaying portion 240. In step 40, when the user selects a destination among the sub-items displayed via the user interface, the controller 200 stores the selected destination setting information to an internal memory 220. Hereinafter, the destination setting information is also called the destination setting data. That is, the destination setting data are the ones corresponding to a destination selected among the destination setting items via the user interface.

The mobile terminal 300 thus inputs selection of the destination among the lower items received in the step 502 via the user interface, and then transmits the destination setting information to the information center 100 in step 504.

In step 41, it is checked if additional sub-items of the destination are received. If so, the controller displays the sub-items of the destination in step 43. In the step 44, the controller 200 checks if the sub-items of the destination received in the step 500 are the ones for setting the final destination. If they are not, the controller 200 proceeds back to the step 40 and performs the destination setting process continuously.

If the lower items are not received in the step 41, the controller 200 proceeds to step 42 to decide that the connection is cut off, as also shown in step 506 of FIG. 4. Then the controller 200 sends a message for requesting reconnection and the latest destination setting information stored to the information center 100. This is the same as step 508 in FIG. 4.

Figure 6B:
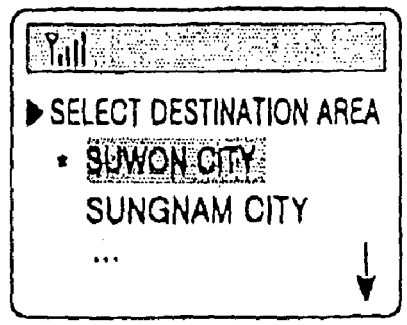
Figure 6C:
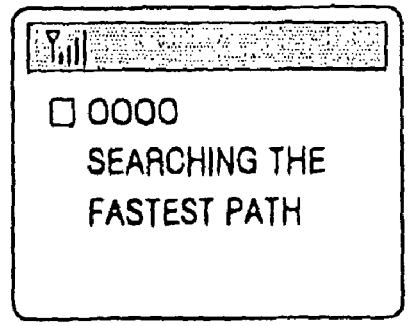

Having received the reconnection request message and the latest destination setting information, the information center 100 sends the sub-items, destination setting items which are necessary for the next step after the latest destination setting step, to the mobile terminal 300 in the step 510. In the process of the above search "Samsung Electronics Co., Maetan-dong Paldal-gu Suwon city, Gyunggi-do", when the connection is cut off in the middle of selecting "Gyunggi-do" to transmit it to the information center 100 due to the limits of data transmission, the mobile terminal 300 stores "Gyunggi-do", the last set destination setting data until the connection is cut off in the step 504. Then the mobile terminal 300 transmits reconnection request message and the last set destination data, "Gyunggi-do" to the information center 100 in step 508. The information center 100 receives those and transmits the next items for the sub-items in the step 510. As shown in FIG. 6*b*, the user can set a destination among "Suwon city" and "Sungnam city", etc., the next items of "Gyunggi-do".

Next, a process of reconnection is described with references to FIGS. 3 and 5, when the connection is cut off in the middle of receiving the path guiding data to the set destination.

In step 43, the controller 200 displays the received destination setting items and proceeds to step 44. In step 44, it checks if the received destination items are the final destination setting ones. If so, it proceeds to step 45. Otherwise, it proceeds back to step 40 and performs the destination setting process.

In the step 45, the controller 200 transmits the final set of destination information and current location data to the information center 100. This is the same as the step 600 in FIG. 5. The information center 100 receives the destination information and transmits the path guiding data to the mobile terminal 300. The controller 200 displays a picture like FIG. 6*c* while the path guiding data is being generated.

Figure 6D:
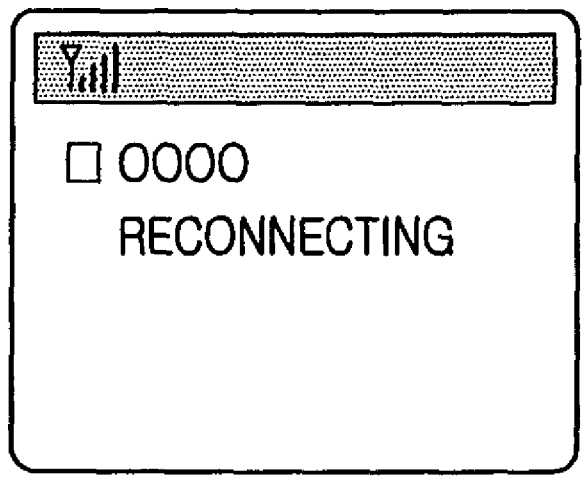
Figure 6E:
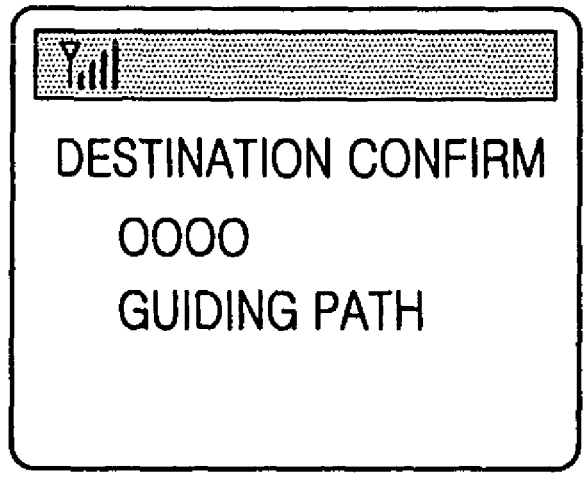

The controller 200 downloads path guiding data from information center 100 in the step 46. In step 47, the controller 200 checks if reception of the path guiding data is completed. If so, the controller 200 proceeds to step 48 and outputs the path through display or voice. Otherwise, the controller 200 proceeds step 49 and checks if the connection is cut off. The cut-off of the connection is decided by checking if data are not received for a predetermined time. If the connection is cut off during reception of the path guiding data as step 604, the controller 200 proceeds to step 50 and stores the previously received path guiding data. This is the same as step 606 in FIG. 5. By performing the above, it can be known that the received data information is not perfect. The controller 200 then proceeds to step 51 and transmits the reconnection request message and an indication of the amount of the path guide received and stored in the step 50 to the information center 100. While requesting the reconnection, the controller 200 of the mobile terminal 300 displays a picture indicating reconnection is in progress, as shown in FIG. 6*d*. This is the same as step 608 in FIG. 5. Having received the reconnection request message and what path guide data was previously received, the information center 100 transmits rest of the path guiding data which are the next ones previously transmitted. The mobile terminal 300 receives the rest of the path guiding data. When the reception is completed, it displays a path guiding message as shown in FIG. 6*e* or starts to guide through voice.

As describe above, when the mobile terminal is disconnected from the information center in the middle of setting the destination or receiving the path guiding data, the present invention reconnects them automatically and makes the data be processed continuously. Accordingly, it has advantage of not performing the destination setting or the reception of the path guiding data again from the start. It has additional advantage of reducing wireless communication costs.

While the invention has been shown and described with reference to a certain preferred embodiment thereof, it will be understood by those skilled in the art that various changes in form and details may be made therein without departing from the spirit and scope of the invention as defined by the appended claims and their equivalents.

What is claimed is:

1. A method for transmitting and receiving path guiding data of a mobile terminal in a navigation system, which comprises an information center for providing navigation information and the mobile terminal connected with the information center via a wireless network, the method comprising the steps of:

(a) storing information on the received path guiding data in the mobile terminal when the connection is disconnected during reception of the path guiding data corresponding to destination information and current location information, wherein the mobile terminal automatically checks when the connection with the information center is disconnected before reception of the path guiding data is completed and stores the path guiding data received prior to disconnection in an internal memory;

(b) transmitting automatically via the mobile terminal a reconnection request message and a message including path guiding data corresponding to the stored information on the received path guiding data to the information center, prior to reconnection; and (c) receiving at the mobile terminal the rest of the path guiding data transmitted from the information center upon reconnection and in response to the reconnection request message and in accordance with the message including the path guiding data.

2. The method according to claim 1, wherein step (a) comprises:

transmitting the last set destination information and current location information to the information center; and receiving the destination information and the path guiding data corresponding to the current location information from the information center.

3. The method according to claim 2, wherein the automatic check for disconnection further comprises checking if the path guiding data is received for a predetermined time, and deciding that the connection is disconnected if the path guiding data is not received in the predetermined time.

4. The method according to claim 1, wherein the step (b) further comprises displaying a picture indicating reconnection during the reconnection request.

* * * * *